United States Patent [19]

Sturmer

[11] 3,988,154

[45] Oct. 26, 1976

[54] PHOTOGRAPHIC SUPPORTS AND ELEMENTS UTILIZING PHOTOBLEACHABLE OMICRON-NITROARYLIDENE DYES

[75] Inventor: David M. Sturmer, Pittsford, N.Y.

[73] Assignee: Eastman Kodak Company, Rochester, N.Y.

[22] Filed: Feb. 3, 1975

[21] Appl. No.: 546,658

Related U.S. Application Data

[60] Division of Ser. No. 443,654, Feb. 19, 1974, which is a continuation-in-part of Ser. No. 260,618, June 7, 1972, abandoned, which is a continuation-in-part of Ser. No. 176,681, Aug. 25, 1971, abandoned.

[52] U.S. Cl. .............................. 96/48 R; 96/48 QP; 96/48 HD; 96/50 R; 96/63; 96/89; 96/87 R; 96/101; 96/114.1; 96/84 R; 96/84 UV; 260/240 A
[51] Int. Cl.² ...................... G03C 5/24; G03C 5/26
[58] Field of Search ........ 96/89, 101, 114.1, 48 QP, 96/48 HD, 48 R, 84 R, 84 UV, 87 R, 50 R, 63; 260/240.9, 240 A, 240 P, 240 K

[56] References Cited
UNITED STATES PATENTS

| 2,255,077 | 9/1941 | Middleton | 260/240 |
| 2,541,472 | 2/1951 | Kendall et al. | 96/101 |
| 2,669,515 | 2/1954 | Kendall et al. | 96/107 |
| 2,953,561 | 9/1960 | Doorenbos | 260/240 |
| 3,023,102 | 2/1962 | Dersch et al. | 96/101 |
| 3,104,973 | 9/1963 | Sprague et al. | 96/48 R |
| 3,647,433 | 3/1972 | Contois | 96/89 |
| 3,705,895 | 12/1972 | Levy et al. | 260/240 D |

*Primary Examiner*—Won H. Louie, Jr.
*Attorney, Agent, or Firm*—C. O. Thomas

[57] ABSTRACT

Novel o-nitro-substituted arylidene dyes are provided in which the o-nitro aryl group of the arylidene dye is joined through a methine chain linkage to a basic heterocyclic radical containing an electron donating atom. These dyes are photobleachable. The photobleachable properties are useful to provide light-sensitive elements in which images can be formed in or on a support by exposure to light to which the dye is sensitive and to provide photobleachable halation protection in photographic elements having coated thereon a photographic imaging layer. The o-nitro-substituted arylidene dyes can be used for antihalation purposes in photothermographic elements. The dyes can be incorporated within silver halide emulsions to reduce internal light scattering (i.e., internal halation) or to desensitize the emulsion. The dyes are also useful in filter layers.

19 Claims, No Drawings

PHOTOGRAPHIC SUPPORTS AND ELEMENTS UTILIZING PHOTOBLEACHABLE OMICRON-NITROARYLIDENE DYES

CROSS-REFERENCE TO RELATED APPLICATIONS

This is a divisional application of Ser. No. 443,654, filed Feb. 19, 1974, which is a continuation-in-part of application Ser. No. 260,618, filed June 7, 1972 (now abandoned), which is a continuation-in-part of application Ser. No. 176,681, filed Aug. 25, 1971 (now abandoned).

This invention relates to photographic supports and elements having associated therewith photobleachable o-nitro-substituted arylidene dyes.

Photolytically induced reactions of certain nitro-substituted compounds have been reported. See, for example, Calvert, J. G., and Pitts, Jr., J. N., *Photo Chemistry*, J. Wiley and Sons, New York, 1966, page 477, describing the photoinduced conversion of o-nitrobenzaldehyde to o-nitrobenzoic acid and the photoinduced reaction of o-nitrostilbenes to several products. Other workers such as Charleton, J. L., and deMayo, P., *Canadian Journal of Chemistry*, 46, 1041 (1968), have reported the reaction of nitrobenzene plus an alkene to yield an unstable cyclic product, and Taylor, E. C., Firth, B., and Pfau, M., *Journal of American Chemical Society*, 87, 1400 (1965), have described the photolytic rearrangemet of nitro-substituted biphenyls.

While the results of these and other workers have been of interest to theoretical chemists, the practical application of these photolytically induced reactions to photography heretofore has not been possible.

The use of dyes in antihalation layers is well-known in the photographic art. These dyes have been incorporated in undercoat layers and backing layers of photographic elements as described in Carroll et al, U.S. Pat. No. 2,527,583. However, the incorporation of the dyes in this manner requires the coating of extra layers. This method also has associated with it the problem of how to remove the dye and/or its absorption characteristics after its usefulness has ceased to exist. In one method, the antihalation dye is incorporated in a layer coated on the opposite side of the support from the picture-recording layers. This layer is then scrubbed off during processing. This method requires extra processing equipment solely for the purpose of removing the antihalation layer and presents the possibility of scratching the support material during the scrubbing operation. In another method, heat-sensitive antihalation dyes are destroyed or have their absorption characteristics suitably altered by subjecting the photographic element to the necessary temperatures at some point during processing. With this method, the possibility exists of also altering thermally sensitive image dyes. Also, the dimensional stability of the image can be adversely affected by this method. It therefore is desirable to provide antihalation protection for photographic elements which avoids these difficulties.

Nitrostyryl dyes have been used as desensitizing dyes for direct-positive emulsions. These dyes contain a basic nucleus of the type used in cyanine dyes, in which the nitrogen atom is quaternized, joined to a nitro-substituted aryl through a vinyl chain containing an even number of carbon atoms. See U.S. Pat. No. 2,541,472 by Kendall et al, 3,023,102 by Dersch et al and 2,953,561 by Doorenbos. Kendall et al also discloses a nitrobenzylidene rhodanine as useful in their direct-positive emulsions. The nitrostyryl dyes exhibit very little or no photobleaching properties and the nitrobenzylidene rhodanine has a broad absorption band in the region of the spectrum below 400 nm.

It is an object of this invention to provide a photographic support or element having associated therewith an arylidene dye.

It is a specific object to provide a photographic support having coated thereon a photographic emulsion having associated therewith an arylidene adsorbing, filter or desensitizing dye.

It is another specific object to provide a photographic support containing therein or thereon a photobleachable dye.

It is a more specific object to provide a photographic element containing a photographic emulsion coating and a photobleachable antihalation or filter layer which can be bleached without scribing or heating.

It is still another specific object to provide a photothermographic element including a support and a photobleachable, thermally stable arylidene dye in or on the support or in an overlying filter layer.

It is yet another object of this invention to provide processes for the preparation of photographic images using these photographic supports and elements.

These and other objects of this invention are accomplished, in one aspect, by providing a photographic support having incorporated therein a photobleachable dye having an o-nitrosubstituted aryl group joined through a methine chain linkage to a basic heterocyclic nucleus containing an electron-donating nitrogen, oxygen or sulfur atom, such that the number of carbon atoms joining said electron-donating atom to said aryl group is an even number. In another aspect, the dye can be incorporated in a binder coated on the support. In still another aspect the dye can be incorporated within a photographic emulsion coating or in an overlying filter layer.

In an additional aspect this invention is directed to a process for preparing a photographic image by imagewise exposing a light-sensitive photographic element comprising a support having associated therewith a photobleachable dye having an o-nitrosubstituted aryl group joined through an acyclic methine chain linkage to a nitrogen, oxygen or sulfur electron donating atom containing basic heterocyclic nucleus, such that the number of carbon atoms joining said electron-donating atom to said aryl group is an even number. The photographic element is exposed to electromagnetic radiaton to which the dye is sensitive.

The dyes employed in the practice of my invention are o-nitro-substituted arylidene dyes. As employed herein the term "arylidene" refers to the group formed by an aryl group and a methine linkage--e.g., benzylidene, cinamylidene, etc. These dyes contain an o-nitro-substituted aryl group joined through a methine chain linkage to a basic heterocyclic nucleus containing an electron-donating atom, typically a nitrogen, oxygen or sulfur electron-donating atom. The number of atoms joining the electron-donating atom and the aryl group is an even number. In a preferred form the o-nitro-substituted aryl group is joined through an acyclic methine chain containing an odd number of methine groups to a 5- or 6-membered basic, cyanine dye type heterocyclic nucleus. The heterocyclic nucleus can have additional carbocyclic and heterocyclic rings fused thereto. The o-nitro-substituted aryl group can contain a phenyl nucleus or can contain a nucleus formed by fused aromatic rings, such as naphthyl, etc.

In a specific preferred embodiment of my invention, the o-nitro-substituted dyes have the formula:

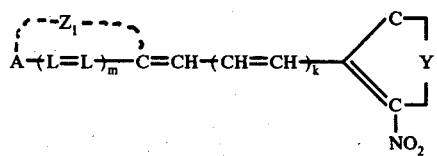

wherein:
a. k represents 0 or 1;
b. m represents 0 or 1;
c. each L represents a methine group, including substituted methine groups, (e.g., —CH=, —C(CH$_3$)=, etc.);
d. A represents an electron donating moiety, such as oxygen (—O—), sulfur (—S—), or

e. R$_1$ represents (1) an alkyl group having from 1 to 18 carbon atoms and preferably a lower alkyl group having from 1 to 4 carbon atoms (e.g., methyl, ethyl, propyl, isopropyl, butyl, secondary-butyl, isobutyl, tert-butyl, pentyl, hexyl, octyl, decyl, dodecyl, octadecyl); a sulfoalkyl group, preferably sulfo lower alkyl containing from 1 to 4 carbon atoms in the alkyl moiety (e.g., β-sulfoethyl, γ-sulfopropyl, γ-sulfobutyl, δ-sulfobutyl, etc.); a carboxyalkyl group, preferably a carboxy lower alkyl containing from 1 to 4 carbon atoms in the alkyl moiety (e.g., β-carboxyethyl, δ-carboxypropyl δ-carboxybutyl, etc.), a sulfatoalkyl group, preferably a sulfato lower alkyl containing from 1 to 4 carbon atoms in the alkyl moiety (e.g., β-sulfatoethyl, γ-sulfatopropyl, δ-sulfatobutyl, etc.); an alkoxyalkyl group, preferably a lower alkoxy lower alkyl containing from 1 to 4 carbon atoms in both the alkoxy and alkyl moieties (e.g., β-methoxyethyl, γ-methoxypropyl, δ-propoxybutyl, etc.); an acyloxyalkyl group, preferably an acyloxy lower alkyl containing from 1 to 4 carbon atoms in the alkyl moiety (e.g., acetyloxyethyl, propanoyloxyethyl, butanoyloxybutyl, benzoyloxyethyl, toloyloxypropyl, etc.); an alkoxycarbonylalkyl group, preferably a lower alkoxy carbonyl lower alkyl containing 1 to 4 carbon atoms in both the alkoxy and alkyl moieties (e.g., β-methoxycarbonylethyl, δ-ethoxycarbonylbutyl, β-butoxycarbonylethyl, etc.); a dialkylaminoalkylene group, preferably a di-lower alkylamino lower alkylene containing 1 to 4 carbon atoms in the alkylene and alkyl moieties (e.g., dimethylaminoethylene, diethylaminopropylene, diethylaminobutylene, etc.); a cycloaminoalkylene group, preferably cycloamino lower alkyl containing 4 to 6 atoms in the cycloamino moiety and 1 to 4 atoms in the alkyl moiety (e.g., pyrrolidinylethylene, morpholinopropylene, piperidinobutylene, pyrrolinylmethylene, etc.); (2) an alkenyl group (including a substituted alkenyl group), preferably a lower alkenyl containing 2 to 4 carbon atoms (e.g., ethyl, allyl, 1-propenyl, 1-butenyl, 2-butenyl, etc.), or (3) an aryl group (including a substituted aryl)--e.g., phenyl, naphthyl, tolyl, xylyl, halophenyl such as p-chlorophenyl, p-bromophenyl, etc., alkoxyphenyl such as methoxyphenyl, 2,4-dichlorophenyl, etc. and an aralkyl group, preferably an aryl lower alkyl containing from 1 to 4 carbon atoms in the alkyl moiety (e.g., benzyl, β-phenethyl, ω-phenbutyl, etc.)

f. Y represents the atoms necessary to complete an aryl (preferably phenyl or naphthyl) ring which is ortho-nitro-substituted and preferably is also para-substituted with a nitro or other electron-withdrawing group and which can have other substituents attached to it and other carbocyclic rings fused to it (e.g., 2-nitrophenyl, 2,4-dinitrophenyl, 2,6-dinitrophenyl, 2,4,6-trinitrophenyl, 2-nitronaphthyl, 2,4-dinitronaphthyl, 2-nitro-4-cyanophenyl, 2-nitro-4-ethoxycarbonylphenyl, 2-nitro-4-trifluoro-methylphenyl, and the like); and g. Z$_1$ represents the nonmetallic atoms necessary to complete a heterocyclic nucleus of the type used in cyanine dyes containing 5 or 6 atoms in the heterocyclic ring containing the electron-donating atom of the formula which ring can contain a second hetero atom such as oxygen, nitrogen, selenium or sulfur. The heterocyclic nucleus preferably is selected from the group consisting of a thiazole nucleus including substituted and unsubstituted benzothiazole and naphthothiazole nuclei and like, (e.g., thiazole, 4-methylthiazole, 4-phenylthiazole, 4,5-diphenylthiazole, 4-(2-thienyl)-thiazole, benzothiazole, 4-chlorobenzothiazole, 4-methylbenzothiazole, 4-methoxybenzothiazole, 4-ethoxybenzothiazole, 4-phenylbenzothiazole, 5-chlorobenzothiazole, 5-bromobenzothiazole, 5-methylbenzothiazole, 5-methoxybenzothiazole, 5-ethoxybenzothiazole, 5-phenylbenzothiazole, 6-chlorobenzothiazole, 6-bromobenzothiazole, 6-methylbenzothiazole, 6-methoxybenzothiazole, 6-ethoxybenzothiazole, 5-methoxynaphtha[2,3-d]thiazole, β-naphthothiazole, α-naphthothiazole, 5-nitrobenzothiazole, 6-nitrobenzothiazole, 5-chloro-6-nitrobenzothiazole, etc.); an oxazole nucleus including substituted and unsubstituted benzoxazole and naphthoxazole nuclei and the like, (e.g., oxazole, 4-phenyloxazole, benzoxazole, 5-chlorobenzoxazole, 5-methylbenzoxazole, 5-bromobenzoxazole, 5-methoxybenzoxazole, 5-ethoxybenzoxazole, 5-phenylbenzoxazole, 5-methoxynaphthoxazole, 5-nitrobenzoxazole, 6-nitrobenzoxazole, 5-chloro-6-nitrobenzoxazole, etc.); a selenazole nucleus including substituted and unsubstituted benzoselenazole and naphthoselenazole nuclei and the like, (e.g., selenazole, 4-methylselenazole, 4-4-nitroselenazole, 4-phenylselenazole, benzoselenazole, 5-chlorobenzoselenazole, 6-chlorobenzoselenazole, naphtho[2,1-d]-selenazole, 5-nitrobenzoselenazole, 6-nitrobenzoselenazole, 5-chloro-6-nitrobenzoselenazole, nitro group-substituted naphthoselenazoles, etc.); a thiazoline nucleus, (e.g., thiazoline, 4-methylthiazoline, 4-nitrothiazoline, etc.); a 2-pyridine nucleus, (e.g., 2-pyridine, 5-methyl-2-pyridine, etc.); a 4-pyridine nucleus, (e.g., 4-pyridine, 3-methyl-4-pyridine, nitro group-substituted pyridines, etc.); a 3,3-dialkylindolenine nucleus (e.g., 3,3-dimethylindolenine, 3,3-diethyl-5 or 6-cyanoindolenine, 3,3-diethyl-5 or 6-nitroindolenine, 3,3-dimethyl-5 or 6-nitroindolenine, etc.); an imidazole nucleus, (e.g., imidazole, 1-alkylimidazole, benzimidazole, 1,3-dialkyl, 1,3-diaryl or 1-alkyl-3-arylimidazoles and benzimidazoles, such as 5-chloro-1,3-dialkylbenzimidazoles, 5-chloro-1,3-diarylbenzimidazoles, 5,6-dichloro-1,3-diarylbenzimidazoles, 5-methoxy-1,3-dialkylbenzimidazoles, 5-methoxy-1,3-diarylbenzimidazoles, 5-cyano-1,3-dialkylbenzimidazoles, 5-cyano-1,3-diarylbenzimidazoles, 1,3-dialkylnaphth[1,2-d]imidazole, 1,3-diarylnaphth[2,1-d]imidazole, etc.); a quinoline nucleus, (e.g., quinoline, 6-methylquinoline, 6-methoxyquinoline, 6-ethoxyquinoline, 6-chloroquinoline, 4-methoxyquinoline, 4-methylquinoline, 8-methoxyquinoline, β-methylquinoline, 4-chloroquinoline, 6-nitroquinoline, etc.); an imidazo[4,5-b]quinoxaline nucleus (as described in Brooker and Van Lare, U.S. Pat. No. 3,431,111), (e.g., imidazo[4,5-b]quinoxaline, 1,3-dialkylimidazo[4,5-b]quinoxaline such as 1,3-diethylimidazo[4,5-b]quinoxaline, 6-chloro-1,3-diethylimidazo[4,5-b]quinoxaline, etc., 1,3-dialkenylimidazo[4,5-b]quinoxaline such as 1,3-diallylimidazo[4,5-b]quinoxaline, 6-chloro-1,3-diallylimidazo[4,5-b]quinoxaline, etc., 1,3-diarylimidazo[4,5-b]quinoxaline such as 1,3-diphenylimidazo[4,5-b]quinoxaline, 6-chloro-1,3-diphenylimidazo[4,5-b]quinoxaline, etc.); a 3H-pyrrolo[2,3-b]pyridine nucleus, e.g., 3,3-dialkyl-3H-pyrrolo[2,3-b]pyridine such as 3,3-dimethyl-3H-pyrrolo[2,3-b]pyridine, 3,3-diethyl-3H-pyrrolo[2,3-b]pyridine, 1,3,3-trialkyl-3H-pyrrolo[2,3-b]pyridine such as 1,3,3-triethyl-3H-pyrrolo[2,3-b]pyridine, etc.); and a thiazolo[4,5-b]quinoline nucleus; a pyrylium (including benzopyrylium, thiapyrylium and benzothiapyrylium) nucleus; and a dithiolinium nucleus.

The above dyes, wherein $k$ represents O, preferably are prepared by reacting a heterocyclic salt of the formula:

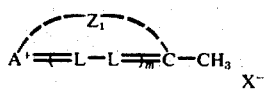

II.

with a nitro-substituted compound having the formula:

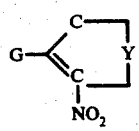

III.

In the above formulae II and III, $m$, $n$, A, $Z_1$, L, and Y have the same meaning as defined above, G represents a halide such as fluoride, chloride or bromide, and X represents an acid anion (e.g., halide such as chloride, bromide, or iodide, p-toluenesulfonate, thiocyanate, sulfamate, perchlorate fluoroborate, methylsulfonate, ethylsulfonate, fluorosulfonate, 2,4-dinitrobenzenesulfonate, etc.).

In accordance with this process of preparation, nitrosubstituted dyes are prepared by the nucleophilic substitution of a compound of formula II for the G substituent of the o-nitrosubstituted aryl compound of formula III. This reaction is advantageously conducted in a suitable solvent. Suitable solvents include any non-nucleophilic solvent such as acetronitrile, benzene, dimethylformamide, tetrahydrofuran, acetone, ether and the like. The quantity of solvent to provide a fluid reaction mixture, suitably from 2 to 10 weight units of solvent per weight unit of reactants.

The reaction is generally conducted at elevated temperatures to accelerate the reaction. Suitable temperatures range from about 40° C. up to about 150° C., although temperatures of from about 60° C. to about 100° C. are preferred. Most conveniently, a reaction solvent is chosen which has a boiling point at a atmospheric pressure in the preferred range and the reaction is conducted at the reflux temperature of the reaction mixture.

The reaction time must be of sufficient duration to allow the reaction to go to completion. If conducted in the preferred range, the reaction is usually complete within 1 to 3 hours. The product is thereupon recovered from the reaction mixture. If acetonitrile is used as the reaction solvent, the dye is generally obtained as a crystalline product when the reaction mixture is cooled to room temperature and allowed to stand for several hours.

The above dyes wherein k represents 1 are prepared by reacting a heterocyclic ammonium salt of the formula:

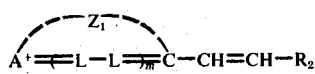

IV.

with a nitro-substituted compound having the formula:

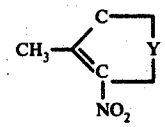

V.

In the above formulas IV and V; $m$, A, $Z_1$, L, and Y and X have the same meaning as defined above. $R_2$ represents a displaceable electrophilic group such as anilino, acetanilino, alkoxy, halo, mercapto and the like. Instead of utilizing a single vinylene group attached to $R_2$ in formula IV, two or more vinylene groups can be interposed between $R_2$ and the heterocyclic ring and the resulting dye.

The above reaction is conducted in the presence of a base-solvent combination. Preferably the bases are non-nucleophilic bases such as diisopropylethylamine, sodium hydride, butyl lithium, etc. Suitable solvents include tetrahydrofuran, dioxane, dimethyl sulfoxide, acetonitrile and the like. Reaction times and temperatures can be chosen in the same manner as for the preceeding dye preparation method.

These ortho-nitro-substituted dyes exhibit excellent photobleaching properties. That is, they are colored until exposed to electromagnetic radiation to which they are sensitive. The dyes thereupon decolorize or are bleached in such a manner that they have significantly less absorbance. These dyes photobleach both in solutions as well as in the solid state, although the rate of bleaching is generally faster when in solution form.

The relative rate of bleaching of different compounds depends on various factors such as the heterocyclic moiety containing the electron donating atom (e.g., in formula I that portion of the formula containing $Z_1$). The rate of bleaching also depends upon the number of nitro groups on the aryl ring and their position relative to the machine chain. of a second ortho-nitro substituent generally decreases the rate o photobleaching in those dyes wherein Y represents the atoms necessary to complete a phenyl ring. Where Y represents the atoms necessary to complete a 2,4-dinitro-substituted phenyl group, on the other hand, the dyes exhibit a relatively rapid rate of bleaching, generally more rapid than the single ortho-nitro-substituted dyes.

The o-nitro-substituted dyes can be used with photographic supports and elements for several different purposes. In one form the dyes can be incorporated into a photographic support or coated onto the support in a binder and used to produce photographic images. One or more of the photobleachable dyes associated with the support are simply imagewise exposed to actinic electromagnetic radiation for a length of time sufficient to cause the amount of bleaching desired. Since the dyes bleach directly upon exposure, no processing is required in order to obtain a visible image. The images obtained can be viewed under low-intensity light or under lighting conditions not containing electromagnetic radiation to which dye or dyes are sensitive. A positive of the original image is obtained.

When the photograph is viewed under normal lighting conditions, the background areas initially protected from exposure will be bleached unless special precautions are taken. Since the intensity of normal indoor room lighting is generally much lower than the intensity of the exposing light, the image can be viewed for several minutes or more without significant degradation of quality. If it is later desired that the image be obliterated, this can be easily accomplished by blanket exposure to electromagnetic radiation until the image is no longer visible. Because of the nonstable properties of the photograph obtained, it can be used as a proof image. If a permanent record of the proof image is desired, it can be photographically copied using conventional photographic materials.

Instead of relying upon the o-nitro-substituted dyes to produce images, they can be incorporated into a photographic support and employed for the antihalation protection of a separate photographic imaging layer. The dyes can also be incorporated into a binder and coated onto the support to provide antihalation protection for the separate photographic imaging layer. The dyes can also be used to form filter layers. In still another form, the dyes can be dispersed as absorption dyes within a photographic imaging layer, such as a silver halide emulsion coating, to reduce light scattering within the imaging layer and thereby contribute to the formation of sharper images —i.e., provide antihalation protection internally of the photographic imaging layer.

Since the optical density attributable to the dyes is readily decreased, there is no need to remove the dye after exposure, as is typical of conventional antihalation materials. Further, by using the o-nitro-substituted dyes for antihalation protection, the difficulties of contamination of processing solutions or the use of separate processing steps required for antihalation layer removal can be avoided. It is to be recognized that in antihalation and filter layer applications the dye is not required to bleach on imagewise exposure. Rather the o-nitro-substituted dye can be primarily bleached after processing of the photographic element, if desired. For most applications the dyes are sufficiently bleached merely by allowing the exposed and processed photograph to remain uniformly exposed to ambient room light. It is, of course, recognized that the dyes can be quickly bleached by uniform exposure to actinic electromagnetic radiation under conditions similar to those employed for imagewise exposure when the dyes are themselves used for imaging.

While the o-nitro-substituted dyes can be employed for antihalation and filtering with a variety of conventional photographic imaging layers, these dyes are particularly advantageous when employed in combination with photothermographic imaging layers. As is well appreciated by those skilled in the art, photothermographic elements are processed by heating to elevated temperatures, typically within the temperature range of from 80° to 170° C. The o-nitro-substituted dyes are well suited for use in photothermographic elements, since they surprisingly possess a high level of thermal stability, yet are readily photobleachable. The thermal stability of the o-nitro-substituted dyes is, of course, also advantageous in applications where it is desired to incorporate the dye into a melt from which the support is to be fabricated.

In still another application, when the o-nitro-substituted dyes are chosen to be absorbed by silver halide crystals, they can be incorporated into a silver halide emulsion for the purpose of desensitizing the emulsion. This is particularly advantageous where it is desired to provide an emulsion that can be handled under safelight or ambient lighting conditions with retention of sensitivity to more intense or different wavelength radiation—e.g., X-ray radiation. Those o-nitro-substituted dyes which are not readily absorbed by silver halide crystals are useful in silver halide emulsions as light absorbing (internal antihalation) dyes.

In a simple form the present invention is directed to a photographic support incorporating therein an o-nitro-substituted dye. In order to use the dyes for imaging or antihalation protection when incorporated within the support it is necessary that the support be transparent (and it is usually preferred that the support be substantially colorless) except for the dye present. A variety of conventional transparent photographic film supports are known to the art in which the o-nitro-substituted dyes can be incorporated. These supports can be broadly categorized for purposes of this discussion into those that can be solvent cast and those that are formed from a melt. The o-nitro-substituted dyes of this invention can be dissolved in nonionic solvents such as toluene, acetone, dichloromethane, dioxane, dimethylformamide, and the like. To incorporate the o-nitro-substituted dye into a solvent cast film support, such as a cellulosic support—e.g., cellulose nitrate, cellulose diacetate, cellulose triacetate, etc.—it is merely necessary to dissolve the support forming material and the dye in a common solvent system. The o-nitro-substituted dye can be incorporated into melt formed polymeric film supports merely by dispersing the dye within the molten polymer. Since the o-nitro-substituted dyes possess a surprising degree of thermal stability they can be incorporated into melt formed film support materials such as polyalkylenes (e.g., polyethylene), polystyrene, terephthalic acid polyesters such as poly(ethylene terephthalate), polycarbonates and other, lower melting resinous polymers useful in forming film supports. It is generally preferred that the dyes be substantially homogeneously dispersed within the film support so as to exhibit uniform optical density upon viewing the support. This can be readily achieved by thoroughly mixing the dye with the support material using procedures well known in the art.

As is well understood by those skilled in the art very small quantities of antihalation dyes are incorporated in nominally transparent film supports for the purpose of minimizing halation due to laterally transmitted light. Accordingly, the dyes of the present invention will provide some degree of antihalation even when incorporated in quantities too low to be visually detected. However, for most antihalation applications it is preferred that the dyes be incorporated into the support in a concentration sufficient to provide an optical density of at least 0.5, most preferably at least 1.0, before photobleaching. For imaging applications the dye is incorporated in a concentration sufficient to yield an optical density differential between image and background areas of at least 0.05. However, for most imaging applications it is preferred that an optical density differential of at least 0.20 be obtainable and, most preferably, an optical density differential in excess of 0.50.

Where the o-nitro-substituted dye is coated onto a support rather than being incorporated therein, it is, of course, possible to employ any conventional photographic support. The support can be opaque or transparent. The support can take any one of a variety of diverse forms, such as a glass, metal, film, wood, paper or composite (e.g., resin coated paper) support. Where the dye is employed for imaging it is preferred that the dye be chosen to offer a visual contrast in hue or density with respect to the support. To immobilize spatially the dye on the support it is generally preferred that it be incorporated within a transparent binder. In one form the binder with the dye dispersed therein can be identical to the support compositions with the dye incorporated therein as previously discussed. The dye can also be incorporated into any conventional photographic vehicle. Generally any conventional transparent binder can be used. The binder layer containing the dye can be located directly on the support or can be separated by one or more undercoats provided for the purpose of improving adhesion to the support. Suitable conventional photographic vehicles useful as binders and layer arrangements are described in *Product Licensing Index*, Vol. 92, December 1971, publication 9232, page 108, paragraph VIII, here incorporated by reference. Generally the dye concentration in the binder layer is chosen to provide optical densities similar to those set forth above for dyes incorporated in the support. Optically homogeneous dispersion of the dye in the binder is preferred. This can be achieved by techniques well known to those skilled in the art.

One method which has been found to yield satisfactory results is to prepare a 5 to 10 percent by weight solution of the binding agent in a satisfactory solvent and to saturate the solution with the o-nitro-substituted dye. Generally any solvent which exhibits good solvent action for the binding agent is suitable. However, lower molecular-weight solvents having relatively high volatility such as acetone, methyl ethyl ketone, methanol, ethanol, ethyl acetate, butyl acetate and the like are particularly useful. When binding agents such as gelatin are used which are normally dissolved in water, it may be necessary to dissolve the dye in another solvent and disperse the dye solution in the binding agent solution to form an emulsion. Instead of being dissolved or emulsified in the binder the dye can be finely comminuted to minimize graininess, preferably to average particle sizes of less than 5 microns, most preferably below 1 micron, and simply uniformly dispersed in the binder or agent solution.

The dye blended in the binder or binding agent solution is coated on the support to form the photographic element. Coating can be accomplished by various coating procedures including dip-coating, air-knife coating, curtain-coating, doctor-blade coating or extrusion coating using hoppers of the type described in Beguin, U.S. Pat. No. 2,681,294. If desired, two or more layers may be coated simultaneously by the procedures described in Russell, U.S. Pat. No. 2,761,791, and Wynn, British Pat. No. 837,095. The coverage at which the dispersion is coated on the support can vary widely depending upon the properties of the particular blend and the results to be achieved. For example, satisfactory results are generally obtained when a 5 to 10 percent by weight solution of the binding agent saturated with dye is coated. Wet coated thicknesses of 2 to 100 microns are generally preferred for imaging applications with coatings of like thicknesses or considerably less being useful for antihalation applications.

Where the o-nitro-substituted dyes are to be employed for imaging, it is unnecessary that any other radiationresponsive material be present. In a simple form then a photographic element useful for producing an image can consist of only the support with the dye incorporated therein or incorporated thereon in a binder layer. An image is formed merely by exposing the o-nitro-substituted dye to actinic electromagnetic radiation. Additional dyes, addenda, layers and structural features can be associated with the photographic element which are not incompatible with the intended imaging application.

The electromagnetic radiation to which the dyes are sensitive varies with each particular dye and ranges from the long-wavelength ultraviolet region and into the infrared region, but usually falls in the visible region. Generally speaking, suitable imaging exposures can be accomplished with a tungsten light source. Exposure time depends upon the intensity of the source. For example, many of the dyes are bleached to less than 10 percent of their original density when exposed for 15 seconds to a 500-watt tungsten lamp in a KODAK CAROUSEL projector, although longer exposures with less intense light sources at a greater distance from the light-sensitive element are generally more convenient.

To use the o-nitro-substituted dyes for antihalation protection it is merely necessary to have at least one other radiation-sensitive layer associated with the support. Where the o-nitro-substituted dye is incorporated in a binder layer, this layer can be overcoated with the additional radiation-sensitive layer. Alternatively, the binder layer can be located on the opposite face of the support from the additional radiation-sensitive layer. It is merely necessary that the o-nitro-substituted dye be capable of absorbing radiation of a wavelength capable of exposing the additional radiation-sensitive layer in order for the dye to provide effective antihalation protection.

Where it is desired to employ the dyes for filtering, the o-nitro-substituted arylidene dyes can be used in a separate layer similar or identical to the antihalation layer described above, but with the difference that the filter layer overlies at least one other radiation-sensitive layer. Where a plurality of radiation-sensitive imaging elements are employed, as in color photography, the filter layer can be advantageously located between adjacent radiation-sensitive imaging layers. As is well understood by those skilled in the art, the optical density and spectral absorption of the dye in the filter layer can be varied widely, depending upon the particular choice of radiation-sensitive imaging layers and photographic effects desired. Typically the o-nitro-substituted arylidene dyes are employed for filtering purposes in concentrations sufficient to yield optical densitites of 3.0 or less, most typically from 0.5 to 2.0. The photobleaching and thermal stability characteristics of the o-nitro-substituted arylidene dyes are advantageous in filter layers similarly as in antihalation layers.

While the additional radiation-sensitive layer can take any one of a variety of conventional forms, it is particularly contemplated to employ the o-nitro-substituted dyes for antihalation protection and for filtering with silver halide emulsion coatings. It is further considered particularly advantageous to utilize the o-nitro-substituted dyes for antihalation and filtering in photothermographic elements.

The described o-nitro-substituted dyes are useful in a variety of photothermographic elements according to the invention. Representative of photothermographic elements in which the described o-nitro-substituted dyes are useful is one comprising
  a. an oxidation-reduction image-forming combination comprising
    i. a reducing agent and
    ii. a heavy metal salt oxidizing agent,
  b. a catalyst for the oxidation-reduction image-reduction image forming combination, and
  c. a binder.

Exemplary photothermographic elements of this and other types are described, for instance, in U.S. Pat. No. 3,672,904 of deMauriac, issued June 27, 1972 which relates to bis-beta-naphthol reducing agents with certain cyclic imide activator toning agents; Belgian Pat. No. 802,519, issued Jan. 18, 1974, which relates to certain sulfonamidophenol reducing agents; U.S. Pat. No. 3,457,075 of Morgan et al, issued July 22, 1969; U.S. Pat. No. 3,409,438 of Lokken, issued Nov. 5, 1968; and U.S. Reissue Pat. No. 26,719 of Sorensen et al, issued Nov. 18, 1969; U.S. Pat. No. 3,392,020 of Yutzy et al, issued July 9, 1968; U.S. Pat. No. 3,645,739 of Ohkubo, issued Feb. 29, 1972; Belgian Pat. No. 765,452, issued May 28, 1971; U.S. Pat. No. 3,152,903 of Shepard et al, issued Oct. 13, 1964; U.S. Pat. No. 3,589,901 of Lyons, issued June 29, 1971; U.S. Pat. No. 3,589,903, issued June 29, 1971; U.S. Pat. No. 3,764,328 of Birkeland, issued Oct. 9, 1973; and U.S. Pat. No. 3,764,329 of Lee, issued Oct. 9, 1973.

Other exemplary photothermographic elements in which the described o-nitro-substituted dyes are useful are described in U.S. Pat. No. 3,506,444 of Haist et al, issued Apr. 14, 1970; Belgian Pat. No. 799,262, issued Nov. 8, 1973; and Belgian Pat. No. 766,590, issued June 15, 1971.

Photothermographic materials according to the invention can contain a variety of addenda known to be useful in phothermographic materials. For example, they can contain activator-toning agents, also known as toners, reducing agents, antifoggants, addenda which reduce post-processing printout density formation, development modifiers, spectral sensitizing dyes and the like. Typical addenda useful in photothermographic materials according to the invention are described, for example, in U.S. Pat. No. 3,672,904 of deMauriac, issued June 27, 1972, Belgian Pat. No. 766,590, issued June 15, 1971 and Belgian Pat. No. 799,262, issued Nov. 8, 1973.

The photothermographic elements according to the invention can have an overcoat layer, such as described in copending U.S. application Ser. No. 385,934 of Hamb et al, filed Aug. 6, 1973 and U.S. Ser. No. 385,935 of Hamb et al, filed Aug. 6, 1973.

It is specifically recognized that the o-nitro-substituted dyes of this invention can be used as an absorber dye directly within a radiation-sensitive layer to prevent radiation scattering within this layer. By absorbing scattered radiation sharper images are obtained. It is specifically contemplated to incorporate the o-nitro-substituted dyes in silver halide emulsions to act as absorber dyes. Since the o-nitro-substituted dyes can be photobleached after the photographic element is fully processed, the concentration of the o-nitro-substituted dye is typically limited only by the reduction in speed that can be tolerated for the radiation-sensitive layer. Very low levels of incorporated o-nitro-substituted dye will produce a significant increase in sharpness, since a significant component of scattered radiation moves laterally. For most applications it is preferred to incorporate from 0.01 to 0.40 gram of o-nitro-substituted dye per gram of silver halide present in the radiation-sensitive layer. The dye is, of course, chosen to absorb radiation of a wavelength to which the radiation-sensitive layer is responsive.

In addition to acting as an absorbing dye which provides internal antihalation protection to a radiation-sensitive layer the o-nitro-substituted dye can also act as a desensitizer for silver halide emulsions. It is preferred to employ those o-nitro-substituted arylidene dyes of this invention as absorber dyes in silver halide emulsions which are less readily or totally unadsorbed by silver halide crystals and to employ those remaining dyes which are more readily adsorbed by silver halide crystals as desensitizers.

As used herein, "a desensitizer" for a photographic silver halide emulsion refers to a dye which, when added to a gelatinous silver bromoiodide emulsion containing 2.5 mole percent iodide (based on total silver halide) at a concentration of from 0.01 to 0.4 gram of dye per mole of silver halide, causes a loss in the blue speed of the emulsion when sensitometrically exposed and developed for 6 minutes in an Elon-hydroquinone developer at room temperature. Preferred desensitizers are those which, when tested as just described, cause a loss of at least 50 percent and preferably 90 percent or more of speed to blue radiation.

The o-nitro-substituted dyes can be incorporated into radiation-sensitive layers, such silver halide emulsion coatings, by techniques well known to those skilled in the art. For example, to prepare a gelatino-silver halide emulsion incorporating the o-nitro-substituted dye, a quantity of the dye is dissolved in methyl alcohol or other suitable solvent, and this solution (which can be diluted with water) containing the dye is slowly added to 1000 cc of a gelatino-silver halide emulsion with stirring. It is, of course, desired to substantially uniformly disperse the dye within the radiation-sensitive layer, so that localized variations in coating response are minimized. The radiation-sensitive layers and the silver halide emulsion layers specifically can take any desired conventional form, and it is specifically contemplated to employ the o-nitro-substituted dyes in multilayer elements, such as those typically employed to form conventional color photographs. Typical emulsions, addenda, coatings and coating combinations contemplated for use with the o-nitro-substituted dyes are illustrated by those disclosed in *Product Licensing Index*, Vol. 92, Dec. 1971, publication 9232, pages 107 through 110, the disclosure of which is here incorporated by reference.

Certain of the photobleachable dyes of formula I are also useful in sensitizing organic photoconductors for use in electrophotographic reproduction processes. These dyes are particularly useful because of their photobleaching properties. Subsequent to making the photographic copy, the copy is subjected to electromagnetic radiation, usually room light, to which the dyes are sensitive. The dyes thereupon bleach to a substantially colorless compound resulting in an increase in the contrast between the toner and the background in the copy. Use of these dyes as sensitizers for organic photoconductors is disclosed in U.S. Pat. No. 3,647,453, issued Mar. 7, 1972.

The following examples are included to illustrate further the invention.

EXAMPLE 1

The dyes shown in Table 1 below are dissolved in toluene or benzene and the resultant solution is allowed to stand under yellow ceiling fluorescent lights emitting visible light predominantly of wavelengths greater than 490 nm. In Table 1 a photobleachability rating of 1 indicates a photobleaching half life of 20 to 25 minutes while a rating of 2 indicates a photobleaching half-life of 1 hour or more. The dyes of Table 1 are 2,4-dinitrobenzylidene dyes having the formula:

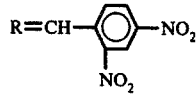

wherein the R term is defined for each dye in table 1, pages 26 and 27.

General preparation for dinitrobenzilidene dyes of Table 1:

The quaternary salt (5 grams) $R^+ CH_3 X^-$, where R is a heterocyclic nucleus represented in Table 1 and X is an acid anion, usually p-toluenesulfonate, is added to a solution containing 50 ml. of acetonitrile and 3½ ml. of the non-nucleophilic tertiary amine di-isopropylethylamine. To this reaction mixture is added 3 ml. of 1-fluoro-2,4-dinitrobenzene and the resultant mixture is heated to reflux for 1 to 3 hours. The solution is cooled and allowed to stand overnight, whereupon the crystalline product generally precipitates and can be collected by filtration and recrystallized from benzene.

EXAMPLE 2

To a silver bromoiodide gelatin emulsion wherein the silver bromoiodide contains 2.5 mole percent iodide are added the dyes shown in Table 2 below at a level of 200 mg. of dye per mole of silver bromoiodide. The emulsion samples containing the dyes and a control containing no dye are coated on cellulose acetate film supports at a coverage of 100 mg. of silver per square foot. A sample of each coating is exposed to a mercury vapor lamp emitting radiation predominantly at 365 nm., developed for 6 minutes in an Elon-hydroquinone developer, fixed, washed and dried. The results are shown in Table 2, page 28. The relative photographic speed data demonstrates that the dyes exhibit desensitizing action.

Table 1

| Dye | R | Solution λmax. (nm.) | Melting Point °C. | Photo-bleach-ability |
|---|---|---|---|---|
| I | (benzimidazole, N-Et, N-Et) | 520 | 265–266 | 1 |
| II | (quinoline, S, N-Et) | 491 | 278–281 | 1 |
| III | (O₂N-phenyl, S, N-Et) | 497 | 272–274 | 2 |

Table 1-continued

| Dye | R | Solution λmax. (nm.) | Melting Point °C. | Photo-bleach-ability |
|---|---|---|---|---|
| IV | (3,3-dimethyl-1-methyl-indolin-2-ylidene) | 490 | 145–147 | 2 |
| V | (6-chloro-1,4-diallyl-quinoxaline derivative) | 505 | 166–168 | 1 |
| VI | (3,3-dimethyl-1-methyl-pyrrolo[2,3-b]pyridin-2-ylidene) | 461 | 123–126 | 2 |
| VII | (1,4-dimethyl-quinoxaline derivative) | 515 | 299–300[a] | 1 |
| VIII | (6-chloro-1,4-diethyl-quinoxaline derivative) | 514 | 246–247 | 1 |

[a]recrystalized from dimethylsulfoxide

Table 2

| Dye[a] | Relative Photographic Speed |
|---|---|
| control-none | 100 |
| I | 4.6 |
| II | 3.6 |
| III | 4.5 |

[a]see Table 1

EXAMPLE 3

A series of photosensitive elements are prepared by coating dispersions of a dye in gelatin. Dispersion 1 is prepared by dissolving the dye in tricresyl phosphate and dispersing the solution in gelatin by passing it through a colloid mill several times as described in Jelley and Vittum, U.S. Pat. No. 2,322,207. Dispersion 2 is prepared without a high-boiling solvent as described in Fierke and Chechak, U.S. Pat. No. 2,801,171. The dispersions are coated on a polyester support at a coverage of 10 mg. of dye per square foot.

Heat stability of the coatings is determined by heating the sample to 200° C. on a metal block for 10 seconds. Photobleachability is determined by exposing the sample for 15 seconds to a 500-watt tungsten lamp in a KODAK CAROUSEL projector. Storage stability is determined by incubating the sample for 1 week at 120° F. and 50% relative humidity. The optical density values shown in Table 3a are determined by measuring the samples on a densitometer at the wavelength of maximum absorption.

Table 3a

| Dye[a] | Dispersion | max. nm. | Optical Density | | | | |
| | | | Fresh | Heat Test | Light Exposure | Heat Test + Light Exposure | Incubated |
|---|---|---|---|---|---|---|---|
| I | 1 | 540 | .300 | .410 | .100 | .160 | .272 |
| I | 2 | 610 | .145 | .160 | .100 | .115 | — |

-continued

| | | | | | | | |
|---|---|---|---|---|---|---|---|
| II | 1 | 510 | .305 | .560 | .110 | .200 | .365 |
| III | 1 | 525 | .280 | .515 | .105 | .220 | .280 |
| IV | 1 | 510 | .750 | .790 | .120 | .200 | .767 |
| V | 1 | 520 | .780 | .885 | .110 | .180 | .730 |
| VI | 1 | 480 | .580 | 1.000 | .150 | .240 | .617 |
| VIII | 1 | 530 | .550 | .920 | .120 | .190 | .483 |
| IX | 1 | 530 | .500 | .640 | .105 | .170 | .520 |
| X | 1 | 565 | .410 | .285 | .150 | .240 | .282 |
| XI | 1 | 615 | .595 | .660 | .100 | .160 | .595 |
| XII | 1 | 575 | .610 | .940 | .400 | .210 | .600 |

*For dyes I-VIII see Table 1. For dyes IX to XII see Table 3b.

Table 3b

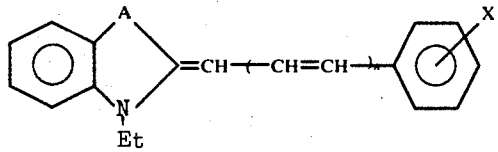

| Dye | A | n | X |
|---|---|---|---|
| IX | S | 0 | 2,4-di-NO$_2$ |
| X | S | 0 | 2,4,6-tri-NO$_2$ |
| XI | S | 1 | 2,4-di-NO$_2$ |
| XII | Se | 0 | 2,4,6-tri-NO$_2$ |

EXAMPLE 4

Photosensitive elements are prepared by saturating polymeric solutions with a dye as shown in Table 4. The solution obtained is coated on a polyester film support at a wet thickness of about 0.008 inch and allowed to dry. The dried coatings are imagewise-exposed to a test image with a 150-watt tungsten source. Subsequent to exposure, it is found that the photosensitive coating bleaches imagewise in proportion to the amount of exposure received. The coatings containing dyes VI, IX, and XII are exposed to the appropriate color separation positives. Subsequent to exposure, registration of the three exposed coatings yields a positive color picture. A permanent record of this color picture can be made by photographically recording with conventional color photographic materials. The complete structure of the dyes of Table 4, page 31, are obtained by inserting the R term shown into the generic formula of Example 1.

EXAMPLE 5

Two photographic film supports are prepared having incorporated therein thermally stable light-bleachable dyes by thoroughly mixing 0.16 g. of the dye and 60 g. of polyethylene and melting the resultant mixture at about 177° C. in a wedge-shaped form to yield a polyethylene film sample of varying thickness. The first support contains dye VIII from Example 1 and the second support contains dye XVIII: 2-(2,4-dinitro-1-naphthylmethylene)-1,3-diethyl-2,3-dihydro-1H-imidazo[4,5-b]quinoxaline. Visual examination of these film samples shows areas of dissolved dye and of dye crystals in the polyethylene. Both the dye crystals and the uniform dye areas are photobleachable.

EXAMPLE 6

Several portions of photographic film support are prepared by mixing 0.16 g. of dye VIII from Example 1 and 60 g. of polyethylene for 15 minutes at a temperature of about 170° C. followed by coating into a solid mass.

Table 4

| Dye | R | Solvent + Polymer | Color |
|---|---|---|---|
| XIII | (Et—N quinoline structure) | 10% polyvinylpyridine in 1:1 acetone:methanol | cyan |
| IX | see Table 3b | 5% butylacrylate:styrene in ethylacetate | magenta |
| VI | see Table 1 | " | yellow |
| I | see Table 1 | " | magenta |
| XIV | (5,6-dichloro-1-Et-3-Me benzimidazoline structure) | 5% butylacrylate:styrene in ethylacetate | magenta |
| IV | see Table 1 | " | orange |

Table 5

| Sample | Extrusion Temp. | Absorbance[a] |
|---|---|---|
| A | 204° C. | 0.15 |
| B | 218° C. | 0.19 |
| C | 232° C. | 0.15 |
| D | 260° C. | 0.21 |
| E | 274° C. | 0.26 |
| F | 288° C. | 0.21 |
| G | 316° C. | 0.12 |

[a]corrected for base line of 0.06 absorbance unit

Each of the solid mixture portions is chopped into small pieces, remelted and remixed at about 170° C., yielding a homogeneous dye in polyethylene solution. Each of the portions is then extruded into a thin polyethylene sheet (thickness 0.0036–0.0036 inch) at the temperature described in Table 5. All samples visually appear uniform with no dye crystals. Each sample is washed with acetone to remove any surface dye and the absorbance of each sample at 565 nm. is reported in Table 5, page 31. Samples E through G above contain some dye streaks. All samples upon exposure to light bleach to a residual optical density of 0.06 at 565 nm.

EXAMPLE 7

Photographic film supports are prepared by mixing 2.0 g. of a thermally stable photobleachable dye as indicated in Table 6 below and 2270 g. of polyethylene terephthalate, melting the mixture in the hopper of an extruder and extruding the supports at a temperature of 260° C. The supports thus obtained appear uniform with no dye crystals observed. The supports are photobleached by exposure to a tungsten light source. The unbleached optical density of the supports is measured at the λmax. of the dye and the photobleached optical density of the film sample is measured at 400 nm.

EXAMPLE 8

A photographic film support is prepared by mixing dye VIII of Example 1 in an amount sufficient to result in an optical density of 0.60 when mixed with polyethylene terephthalate, melted and extruded into a sheet of about 4 mils' thickness. A second photographic film support is prepared in a similar manner with a resulting density of 0.10.

Table 6

| Dye | λmax. | Unbleached Density | Photobleached Density |
|---|---|---|---|
| I | 540 | 0.54 | 0.06 |
| II | 505 | 0.90 | 0.04 |

Table 7a

| Film Support Density | Exposure | Image Quality |
|---|---|---|
| control | 10 sec. | 1 |
| 0.10 | 10 sec. | 2 |
| 0.60 | 10 sec. | 2 |
| control | 20 sec. | 1 |
| 0.10 | 20 sec. | 2 |
| 0.60 | 20 sec. | 2 |

In Table 7b, exposure is with a Kodak Verifax Copier through a 2.0 neutral density filter.

Table 7b

| Film Support Density | Exposure | Image Quality |
|---|---|---|
| control | 8 sec. | 0 |
| 0.10 | 8 sec. | 2 |
| 0.60 | 8 sec. | 3 |
| control | 15 sec. | 0 |
| 0.10 | 15 sec. | 2 |
| 0.60 | 15 sec. | 3 |

A third photographic film support is prepared as a control by melting polyethylene terephthalate and extruding it into a sheet of about 4 mils thickness.

A photosensitive emulsion is prepared having the following composition:

| 1. silver bromoiodide[a] | 66.8 g. |
|---|---|
| 2. gelatin[b] (10% in water) | 216.0 g. |
| 3. saponin (152.3 mg./ml. of water) | 4.0 ml. |
| 4. 3,3'-diethyloxacarbocyanine iodide (0.20 mg./ml. of methanol) | 80.0 ml. |
| 5. water | 193.0 ml. |

[a]Silver bromoiodide of average grain size 0.2 micron suspended in gelatin
[b]The amount of gelatin added with the silver halide plus this amount equals 5% dried gelatin based on the total weight of the above composition.

The above composition is thoroughly mixed and coated on the three photographic film supports at a wet thickness of 0.008 inch and dried.

Samples of the photographic materials thus prepared are exposed to an image quality test chart, developed in an Elon-hydroquinone developer for 3 minutes, fixed, washed and dried. The image quality evaluations are indicated in Tables 7a and 7b. In Table 7a, contact printing is through the image quality test chart and a 3.0 neutral density filter by a 500-watt photoflood lamp at a distance of 20 inches. In the above Tables 7a and 7b, under image quality evaluation, 0 indicates poor definition of small- and medium-sized letters and line images with increasingly clear definition being indicated by the higher numbers.

Similar results are obtained when other nitroaryl dyes such as dyes I through VII of Example 1 are substituted for the dye used in Example 8.

EXAMPLE 9

2-(2,4-Dinitrocinnamylidene)-1-ethyl-1,3-dihydroquinoline

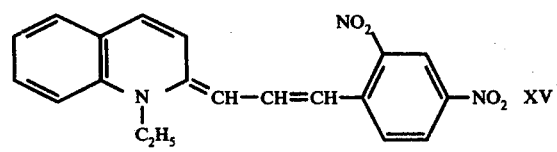

2,4-Dinitrotoluene (10.9 g., 60 mmole), 2-(2-anilinovinyl)-1-ethylquinolinium iodide (8.0 g., 20 mmole), and acetic anhydride (4.1 ml.) are dissolved in dimethylformamide (30 ml.) and heated to near refluxing temperature. Triethylamine (8.4 ml., 60 mmole) is added and the mixture refluxed for 1 minute. The solution is quickly chilled and filtered. The precipitate of the dye product is washed with dimethylformamide and methanol and dried to yield 6.55 g. (90%) of crude dye. The dye is purified by dissolving in dimethylformamide and diluting with methanol whereupon the dye crystallizes. The crystalline material, representing 32% yield, has a m.p. of 230°–231° C. dec. and a λ max. in acetone of 623 nm.

A related dye, 4-(2,4-dinitrocinnamylidene)-1-ethyl-1,4-dihydroquinoline which is similarly prepared, has a m.p. of 229°–230° C. dec. and a λmax. in acetone of 660 nm.

The dyes are each dissolved in separate solutions of poly(dimethylacrylamide) in diisopropylethylamine and acetone and coated on transparent film supports in a manner similar to that of Example 4. Upon exposure the dyes photobleach to a product absorbing at 550 nm. at about 1/10 the extinction of the original dyes.

EXAMPLE 10

4-(2,6-dinitrobenzylidene)-1-ethyl-1,4-dihydroquinoline

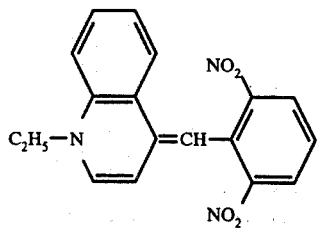

XVI

1-Ethyllepidinium iodide (3.0 g., 10 mmole) and 1-chloro-2,6-dinitrobenzene (2.5 g., 12 mmole) are warmed in acetonitrile (50 ml.) and diisopropylethylamine (2.6 g., 20 mmole) is added. The resulting dark mixture is allowed to cool and stand overnight. The precipitate of dye is filtered off and washed with acetonitrile and ether. On recrystallization from acetonitrile, a 25% yield (0.85 g.) of purified dye is obtained with a m.p. of 154°–155° C. dec.

4-(4-Ethoxycarbonyl-2-nitrobenzylidene)-1-ethyl-1,4-dihydroquinoline

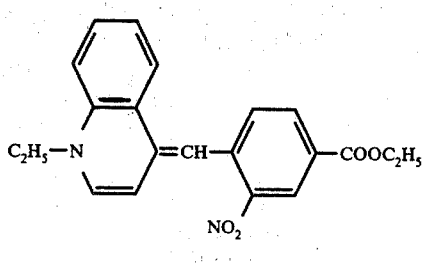

XVII

1-Ethyllepidinium iodide (5.8 g., 19.4 mmole) and ethyl 4-chloro-3-nitrobenzoate (4.6 g., 20 mmole) are stirred together in acetonitrile (50 ml.). Diisopropylethylamine (5.2 g., 40 mmole) is added and the mixture refluxed on a steam bath for 6 hours. The mixture is dissolved in 500 ml. ether and extracted 5 times with 200 ml. portions of water. The ether extract is dried over anhydrous magnesium sulfate. The dried ether solution is evaporated to dryness and then taken up on 25 ml. ether and chilled overnight. The precipitated dye is filtered off, washed with ether and petroleum ether, and dried. The yield is 2.8 g. (40%) with a m.p. of about 100° C.

The above two dyes photobleach in ethyl acetate solution at rates comparable to the dyes in Table I.

EXAMPLE 11

4-(2,4-Dinitrobenzylidine)-2,6-diphenyl-4H-pyran

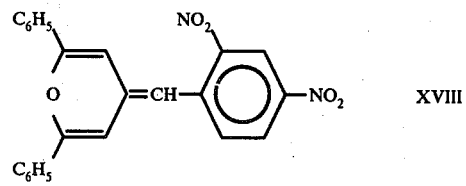

XVIII 2,6-Diphenyl-4-methylpyrylium fluoborate (1.0 g., 0.003 mole) and 1-fluoro-2,4-dinitrobenzene (0.56 g., 0.003 mole) are warmed in acetonitrile (15 ml.). Upon addition of diisopropylethylamine (0.775 g., 0.006 mole), the reaction mixture becomes dark and the reactants dissolve to form a solution. Upon standing overnight a dark precipitate forms which is filtered, washed with methanol and recrystallized from acetonitrile (100 ml.) to yield the above dye (0.32 g., 26% yield) with a melting point of 235°–237° C. (dec.) having an absorption maximum in acetonitrile of 480 nm. Upon exposure to light this dye exhibits photobleaching properties similar to the dyes shown above.

In addition to the dyes shown above, the following typical dye compounds are useful in the invention. Similar results are obtained when these dyes are substituted for the dyes used in Examples I–VIII above.

| Dye No. | Compound |
| --- | --- |
| XIX | 2-(2,4-Dinitrobenzylidene)-4,6-diphenyl-2H-pyran |

23
-continued

| Dye No. | Compound |
|---|---|
| XX | 2-(2,4-Dinitrobenzylidene)-1,3-dithiolane |

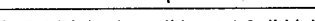

EXAMPLE 12

Five antihalation elements are prepared by coating 0.5 g of the photobleachable dye XIII of Example No. 4 in 100 ml. of a 6% solution of Lexan (which is a Trademark for a thermoplastic polycarbonate condensation product of bisphenol-A and phosgene) in dichloroethane on five poly(ethylene terephthalate) film supports. A brilliant blue layer with an optical density of 2.0 at 640 nm. is observed for each of the elements. One of the elements is then exposed to room light for 40 minutes and the element has a pale orange color and a density of 0.06 at 640 nm. and a density less than 0.2 throughout the visible range. The remaining four antihalation elements are each coated with a light-sensitive, heat-developable composition of the following components:

| | |
|---|---|
| Silver behenate (about 60–70% pure, impurities present are lower molecular weight fatty acids) | 42.0 g |
| Behenic acid | 32.0 g |
| Polyvinyl butyral | 15.0 g |
| Acetone | 250.0 ml |
| Toluene | 250.0 ml |
| Phthalimide | 8.5 g |
| NaBr (reacts with silver behenate to form silver bromide in situ) | 2.4 g |

After ball-mixing for 18 hours, 141 milliliters of the resulting dispersion is combined with the following solutions:

| | |
|---|---|
| Acetone containing 0.08% by weight 3-ethyl-5-[(3-ethyl-2(3H)-benzothiazolylidene)isopropylidene]-2-thio-2,4-oxazolidinedione | 4.4 ml |
| Acetone containing 6.25% by weight 2,2'-dihydroxy-1,1'-binaphthyl | 52.5 ml |

The composition is mixed and then coated on the antihalation elements and dried providing photosensitive and thermosensitive elements containing 60 milligrams of silver per square foot of support. The photosensitive elements are exposed sensitometrically with tungsten light for 0.5 seconds. The resulting latent images are developed by holding the photographic elements in contact with a heated metal block at the times and temperatures in Table 8.

Table 8

| Element | Time (sec.) | Temperature (° C) | $D_{min}$ | $D_{max}$ |
|---|---|---|---|---|
| 2 | 15 | 125 | 0.00 | 1.54 |
| 3 | 10 | 130 | 0.00 | 1.46 |
| 4 | 19 | 135 | 0.02 | 1.35 |
| 5 | 6 | 140 | 0.04 | 1.30 |

24

The developed images are then held in room fluorescent light for 40 minutes to bleach the dye. A sharp image is obtained on a brownish background on each of the four elements.

This invention has been described in detail with particular reference to preferred embodiments thereof, but it will be understood that variations and modifications can be effected within the spirit and scope of the invention.

I claim:

1. A process for preparing a photographic image which comprises imagewise exposing to electromagnetic radiation a light-sensitive photographic element comprising an otherwise transparent support containing therein a photobleachable o-nitro-substituted arylidene dye wherein said photobleachable dye has the following formula:

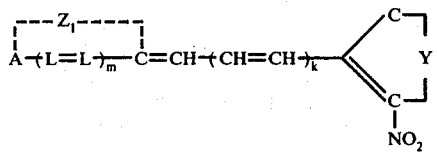

wherein
a. $k$ represents 0 or 1;
b. $m$ represents 0 or 1;
c. each L represents a methine group;
d. A represents oxygen, sulfur or $N-R_1$;
e. $R_1$ represents an alkyl group, an aralkyl group, a sulfoalkyl group, a sulfoatoalkyl group, an alkoxy carbonylalkyl group, an alkoxyalkyl group, an acyloxyalkyl group, a dialkylaminoalkylene group, a cycloaminoalkylene group, an alkenyl group or an aryl group;
f. $Z_1$ represents the nonmetallic atoms completing a cyanine dye type heterocyclic nucleus comprising a 5- or 6-membered heterocyclic ring whose skeletal atoms consist of the oxygen, sulfur or nitrogen atom of A, carbon atoms and one other atom chosen from the group consisting of carbon, oxygen, nitrogen, selenium and sulfur atoms; and
g. Y represents the atoms necessary to complete a phenyl or naphthyl group.

2. The process of claim 1 wherein $Z_1$ represents the nonmetallic atoms completing a thiazole nucleus, an oxazole nucleus, a selenazole nucleus, a thiazoline nucleus, a pyridine nucleus, an imidazole nucleus, a quinoline nucleus, an indolenine nucleus, an imidazo[4,5-b]quinoxaline nucleus, a 3H-pyrrolo[2,3-b]pyridine nucleus, a thiazolo[4,5-b]quinoline nucleus, a 2H-pyran nucleus, a 4H-pyran nucleus or a dithiolane nucleus.

3. A process for preapring a photographic image which comprises imagewise exposing a light-sensitive photographic element comprising on otherwise transparent support containing therein the dye 6-chloro-2-(2,4-dinitrobenzylidene)-1,3-diethyl-2,3-dihydro-1H-imidazo-[4,5-b]quinoxaline, said exposure being to electromagnetic radiation to which said dye is sensitive.

4. A process for preparing a photographic image which comprises imagewise exposing to electromagnetic radiation a light-sensitive photographic element comprising an otherwise transparent support containing therein a dye selected from:
   a. 2-(2,4-dinitrobenzylidene)-1,3-diethyl-2,3-dihydro-1H-imidazo[4,5-b]quinoxaline;
   b. 2-(2,4-dinitrobenzylidene)-3-ethyl-2,3-dihydrothiazolo[4,5-b]quinoline;
   c. 2-(2,4-dinitrobenzylidene)-3-ethyl-6-nitrobenzothiazoline;
   d. 2-(2,4-dinitrobenzylidene)-1,3,3-trimethylindolenine;
   e. 4-(2,4-dinitrobenzylidene)-1-ethylquinoline; and
   f. 4-(2,4-dinitrobenzylidene)-2,6-diphenyl-4H-pyran.

5. A process of preparing a photographic image according to claim 1 in which a photobleachable image is formed by the dye upon imagewise exposure.

6. A process of preparing a photographic image according to claim 1 in which the dye is present in an amount sufficient to impart to the support an optical density of at least 0.2.

7. A process of preparing a photographic image according to claim 6 in which the dye is photobleached by exposure subsequent to imagewise exposure.

8. A process for preparing a photothermographic image employing a photothermographic element comprising an otherwise transparent support and, as a coating on the support, an image-recording layer comprising:
   a. an oxidation-reduction image-forming combination comprising
      i. a reducing agent and
      ii. a heavy metal salt oxidizing agent,
   b. a catalyst for the oxidation-reduction image-reduction image-forming combination, and
   c. a binder,
   the process comprising:
      A. choosing the support to include in an amount sufficient to impart antihalation protection a photobleachable dye having the following formula:

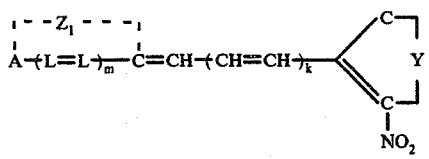

wherein:
   a. $k$ represents 0 or 1;
   b. $m$ represents 0 or 1;
   c. each L represents a methine group;
   d. A represents oxygen, sulfur or $N-R_1$;
   e. $R_1$ represents an alkyl group, an alkenyl group or an aryl group;
   f. $Z_1$ represents the nonmetallic atoms completing a cyanine dye type heterocyclic nucleus comprising a 5- or 6-membered heterocyclic ring whose skeletal atoms consist of the oxygen, sulfur or nitrogen atom of A, carbon atoms and one other atom chosen from the group consisting of carbon, oxygen, nitrogen, selenium and sulfur atoms, and
   g. Y represents the atoms necessary to complete a phenyl or naphthyl group,
   B. imagewise exposing to electromagnetic radiation the image-recording layer and
   C. heating the photothermographic element to form an image.

9. The process for preparing a photographic image which comprises imagewise exposing to electromagnetic radiation a light-sensitive photographic element comprising a support having coated thereon a transparent polymeric binder containing a photobleachable o-nitro-substituted arylidene dye wherein said photobleachable dye has the following formula:

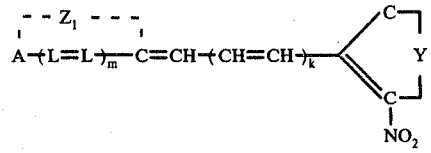

wherein:
   a. $k$ represents 0 or 1;
   b. $m$ represents 0 or 1;
   c. each L represents a methine group;
   d. A represents oxygen, sulfur or $N-R_1$;
   e. $R_1$ represents an alkyl group, an alkenyl group or an aryl group;
   f. $Z_1$ represents the nonmetallic atoms completing a cyanine dye type heterocyclic nucleus comprising a 5- or 6-membered heterocyclic ring whose skeletal atoms consist of the oxygen, sulfur or nitrogen atom of A, carbon atoms and one other atom chosen from the group consisting of carbon, oxygen, nitrogen, selenium and sulfur atoms; and
   g. Y represents the atoms necessary to complete a phenyl or naphthyl group.

10. The process of claim 9 wherein $Z_1$ represents the nonmetallic atoms completing a thiazole nucleus, an oxazole nucleus, a selenazole nucleus, a thiazoline nucleus, a pyridine nucleus, an imidazole nucleus, a quinoline nucleus, an indolenine nucleus, an imidazo[4,5-b]quinoxaline nucleus, a 3H-pyrrolo[2,3-b]pyridine nucleus, a thiazolo[4,5-b]quinoline nucleus, a 2H-pyran nucleus, or a 4H-pyran nucleus.

11. A process for preparing a photographic image which comprises imagewise exposing a light-sensitive photographic element comprising a support having coated thereon a transparent polymeric binder containing the dye 6-chloro-2-(2,4-dinitrobenzylidene)-1,3-diethyl-2,3-dihydro-1H-imidazo[4,5-b]quinoxaline, said exposure being to electromagnetic radiation to which said dye is sensitive.

12. A process for preparing a photographic image which comprises imagewise exposing to electromagnetic radiation a light-sensitive photographic element comprising a support having coated thereon a transparent polymeric binder containing a dye selected from:
 a. 2-(2,4-dinitrobenzylidene)-1,3-diethyl-2,3-dihydro-1H-imidazo[4,5-b]quinoxaline;
 b. 2-(2,4-dinitrobenzylidene)-3-ethyl-2,3-dihydrothiazolo[4,5-b]quinoline;
 c. 2-(2,4-dinitrobenzylidene)-3-ethyl-6-nitrobenzothiazoline;
 d. 2-(2,4-dinitrobenzylidene)-1,3,3-trimethylindolenine;
 e. 4-(2,4-dinitrobenzylidene)-1-ethylquinoline; and
 f. 4-(2,4-dinitrobenzylidene-2,6-diphenyl-4H-pyran.

13. A process of preparing a photographic image according to claim 9 in which a photobleachable image is formed by the dye upon imagewise exposure.

14. A process of preparing a photographic image according to claim 9 in which the dye is present in an amount sufficient to impart an optical density of at least 0.2 to the binder coating.

15. A process of preparing a photographic image according to calim 14 in which the dye is photobleached by exposure subsequent to imagewise exposure.

16. The process according to claim 9 wherein the photobleachable dye is present in an amount sufficient to impart an optical density of at least 0.5 to the binder coating.

17. A process according to claim 16 in which a photothermographic layer forms a separate coating overlying the binder coating and is comprised of
 a. an oxidation-reduction image-forming combination comprising
  i. a reducing agent and
  ii. a heavy metal salt oxidizing agent,
 b. a catalyst for the oxidation-reduction image-reduction image-forming combination, and
 c. a binder.

18. A process of preparing a photographic image according to claim 6 wherein the dye is present in an amount sufficient to impart to the support an optical density of at least 0.5.

19. The process according to claim 27 wherein a silver halide emulsion coating forms a separate coating overlying the binder coating.

* * * * *

UNITED STATES PATENT OFFICE
CERTIFICATE OF CORRECTION

Patent No. 3,988,154          Dated October 26, 1976

Inventor(s) David M. Sturmer

It is certified that error appears in the above-identified patent and that said Letters Patent are hereby corrected as shown below:

Title page, item [54], line 4, "OMICRON-NITROARYLIDENE" should read --o-NITROARYLIDENE--.

Column 1, line 3, "OMICRON-NITROARYLIDENE" should read --o-NITROARYLIDENE--.

Column 24, line 66, "preapring" should read --preparing--.

Column 28, line 6, "calim" should read --claim--; column 28, line 27, "27" should read --16--.

Signed and Sealed this

Twenty-fourth Day of May 1977

[SEAL]

Attest:

RUTH C. MASON
Attesting Officer

C. MARSHALL DANN
Commissioner of Patents and Trademarks